United States Patent
Suekuni et al.

(10) Patent No.: US 10,196,969 B2
(45) Date of Patent: Feb. 5, 2019

(54) EXHAUST DEVICE FOR ENGINE

(71) Applicant: MAZDA MOTOR CORPORATION, Hiroshima (JP)

(72) Inventors: Einosuke Suekuni, Higashihiroshima (JP); Junji Umemura, Aki-gun (JP); Shuhei Tsujita, Hatsukaichi (JP); Makoto Mihara, Higashihiroshima (JP); Tomoaki Fujiyama, Iwakuni (JP); Hiroyuki Hamada, Yanai (JP); Kouji Hadama, Hiroshima (JP); Masahiro Ikeda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 102 days.

(21) Appl. No.: 15/235,150

(22) Filed: Aug. 12, 2016

(65) Prior Publication Data

US 2017/0058763 A1 Mar. 2, 2017

(30) Foreign Application Priority Data

Aug. 24, 2015 (JP) .................................. 2015-165008

(51) Int. Cl.
*F02B 37/18* (2006.01)
*F01N 13/10* (2010.01)
(Continued)

(52) U.S. Cl.
CPC ............ *F02B 37/186* (2013.01); *F01N 13/10* (2013.01); *F01N 13/107* (2013.01); *F02B 37/02* (2013.01);
(Continued)

(58) Field of Classification Search
CPC .... F01N 13/10; F01N 13/107; F01N 2240/36; F01N 2260/10; F01N 2340/06;
(Continued)

(56) References Cited

U.S. PATENT DOCUMENTS 5,119,633 A * 6/1992 Brooks ..................... B60T 1/08
60/602
8,823,225 B2 9/2014 Yuda et al.
2005/0247058 A1* 11/2005 Pedersen ................. F01D 17/14
60/599

FOREIGN PATENT DOCUMENTS

JP S60-095118 U 6/1985
JP H01-174529 U 12/1989
(Continued)

OTHER PUBLICATIONS

An Office Action; "Notification of Reasons for Refusal," issued by the Japanese Patent Office dated Mar. 27, 2018, which corresponds to Japanese Patent Application No. 2015-165008 and is related to U.S. Appl. No. 15/235,150; with English language translation.

*Primary Examiner* — Audrey K Bradley
*Assistant Examiner* — Kelsey Stanek
(74) *Attorney, Agent, or Firm* — Studebaker & Brackett PC (57) ABSTRACT

An exhaust device for an engine, interposed between an engine body, and a supercharger to be driven by a pressure of exhaust gas to be discharged from the engine body, includes a first exhaust passage and a second exhaust passage which introduce exhaust gas to the supercharger; a partition wall disposed between the first exhaust passage and the second exhaust passage, and configured to partition the first exhaust passage and the second exhaust passage from each other; and a valve disposed within the second exhaust passage, and configured to adjust the flow rate of exhaust gas flowing through the second exhaust passage. The partition wall includes a communication portion for communicating between the first exhaust passage and the second exhaust passage.

15 Claims, 5 Drawing Sheets

(51) Int. Cl.
  *F02D 9/04* (2006.01)
  *F02D 41/00* (2006.01)
  *F02B 37/02* (2006.01)
  *F02B 37/22* (2006.01)

(52) U.S. Cl.
  CPC ............... F02B 37/22 (2013.01); F02D 9/04 (2013.01); F02D 41/0007 (2013.01); *F01N 2240/36* (2013.01); *F01N 2260/10* (2013.01); *F01N 2340/06* (2013.01); *F01N 2390/02* (2013.01); *Y02T 10/144* (2013.01)

(58) Field of Classification Search
  CPC .... F01N 2390/02; F02D 9/04; F02D 41/0007; F02B 37/186; F02B 37/02; F02B 37/22; Y02T 10/144; Y02T 10/14
  USPC ......................................................... 60/324
  See application file for complete search history.

(56) References Cited

FOREIGN PATENT DOCUMENTS

| | | | |
|---|---|---|---|
| JP | H01174529 U | * | 12/1989 |
| JP | 2009097335 A | * | 5/2009 |
| JP | 2014-084757 A | | 5/2014 |

* cited by examiner

EXHAUST DEVICE FOR ENGINE

FIELD OF THE INVENTION

The present invention relates to an exhaust device for an engine.

BACKGROUND ART

Conventionally, in a vehicle mounted with a turbocharger engine, a study about enhancing the supercharging performance of a turbocharger is carried out. For instance, Japanese Unexamined Patent Publication No. 2014-84757 discloses an engine, in which the flow rate of exhaust gas to be introduced to a turbocharger is controlled by changing the flow area of exhaust gas within an exhaust passage according to a traveling condition of a vehicle to enhance the supercharging performance of a turbocharger.

Specifically, the turbocharger engine described in the Publication is provided with an engine body, an exhaust valve device connected to an exhaust port of the engine body, and a turbocharger connected to the downstream end of the exhaust valve device. The exhaust valve device is provided with a device body including three low-speed exhaust passages arranged in the cylinder array direction and three high-speed exhaust passages arranged in the cylinder array direction; and an exhaust variable valve disposed in each of the high-speed exhaust passages to adjust the flow rate of exhaust gas flowing through each of the high-speed exhaust passages. The device body is constituted by a metal casting body. The low-speed exhaust passages and the high-speed exhaust passages are partitioned into upper and lower two sections by a partition wall extending along the flow direction of exhaust gas.

The exhaust variable valve in the Publication is closed when a vehicle is in a low speed operating range. Closing the exhaust variable valve makes it possible to increase the flow rate of exhaust gas by concentrating exhaust gas of a small amount in the low-speed exhaust passages. This makes it possible to increase a driving force of a turbine in the turbocharger, and to increase an intake pressure. On the other hand, the exhaust variable valve is opened when the vehicle is in a high speed operating range. Opening the exhaust variable valve makes it possible to supply exhaust gas to the turbocharger through both of the low-speed exhaust passages and the high-speed exhaust passages. This makes it possible to drive the turbocharger and to increase an intake pressure while preventing a drawback that the exhaust variable valve becomes an exhaust resistance.

In the turbocharger engine described in the Publication, however, a plate-shaped partition wall located between the low-speed exhaust passages and the high-speed exhaust passages may be distorted due to thermal stress. If the distortion is large, cracks may occur in the partition wall.

More specifically, particularly when a vehicle is in a high speed operating range, exhaust gas passes both through the low-speed exhaust passages and the high-speed exhaust passages, and in addition to the above, the partition wall does not come into contact with external air. Therefore, the partition wall may be heated by exhaust gas both from the upper and lower surfaces thereof, and large thermal expansion may occur in the partition wall. On the other hand, a portion the engine body in the periphery of the partition wall has a larger thickness than the partition wall, has a high rigidity, and the area of the peripheral portion in contact with external air is large. Therefore, the amount of thermal expansion of the peripheral portion is small, as compared with the partition wall. As a result, large distortion may occur between the partition wall and the peripheral portion due to a difference in the amount of thermal expansion, and cracks may occur in the vicinity of a boundary between the partition wall and the peripheral portion.

Further, when the exhaust variable valve is rendered unmovable in a closed state due to thermal distortion of the partition wall and the peripheral portion, or the like, the following drawback may occur. Specifically, when the vehicle is in a high speed operating range, exhaust gas, which should flow through the high-speed exhaust passages, may collide against the exhaust variable valve, and the flow of exhaust gas may stagnate. As a result, exhaust gas may not be smoothly discharged from the exhaust port of the engine body, and a combustion chamber of the engine may cause combustion failure. This may deteriorate the traveling performance in the high speed operating range.

SUMMARY OF THE INVENTION

In view of the above, an object of the present invention is to provide an exhaust device for an engine, in a vehicle mounted with a supercharger engine, which enables to prevent breakage or damage of an exhaust valve device for adjusting the flow rate of exhaust gas to be supplied to a supercharger due to thermal stress, and enables to suppress deterioration of the traveling performance in a high speed operating range when an operation failure occurs in the exhaust valve device.

In order to solve the aforementioned drawback, an aspect of the present invention is directed to an exhaust device for an engine, interposed between an engine body, and a supercharger to be driven by a pressure of exhaust gas to be discharged from the engine body. The exhaust device includes a first exhaust passage and a second exhaust passage which introduce exhaust gas to the supercharger; a partition wall disposed between the first exhaust passage and the second exhaust passage, and configured to partition the first exhaust passage and the second exhaust passage from each other; and a valve disposed within the second exhaust passage, and configured to adjust the flow rate of exhaust gas flowing through the second exhaust passage. The partition wall includes a communication portion for communicating between the first exhaust passage and the second exhaust passage.

According to the present invention, in a vehicle mounted with a supercharger engine, it is possible to prevent breakage or damage of an exhaust valve device for adjusting the flow rate of exhaust gas to be supplied to a supercharger due to thermal stress, and to suppress deterioration of the traveling performance in a high speed operating range when an operation failure occurs in the exhaust valve device.

These and other objects, features and advantages of the present invention will become more apparent upon reading the following detailed description along with the accompanying drawings.

DETAILED DESCRIPTION OF THE PREFERRED EMBODIMENTS OF THE INVENTION

In the following, an embodiment of the present invention is described referring to the drawings.

Figure 1:
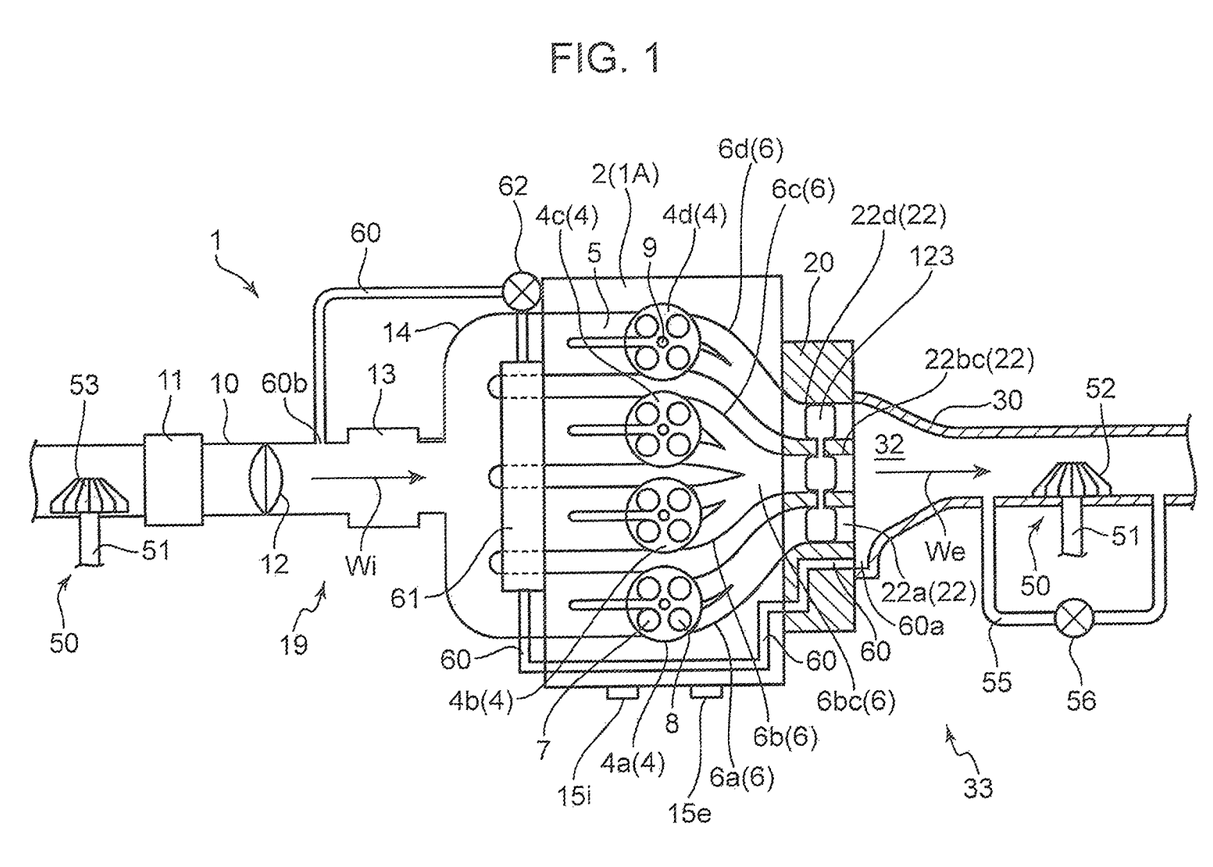
FIG. 1 is a diagram illustrating an overall configuration of an engine according to an embodiment of the present invention.

FIG. 1 illustrates an overall configuration of an engine 1 according to the embodiment. In the embodiment, the terms "upstream" and "downstream" are expressed in terms of a flow of gas flowing through a relevant portion.

The engine 1 is an in-line 4-cylinder 4-cycle spark-ignition engine to be mounted in a vehicle, as a power source for traveling. The engine 1 is provided with an engine body 1A including a cylinder block (not illustrated) and a cylinder head 2 disposed on an upper surface of the cylinder block as main members, an intake passage 19 for guiding intake air Wi to the engine body 1A, an exhaust passage 33 for discharging exhaust gas We from the engine body 1A, and a turbocharger 50 for supplying intake air Wi to the engine body 1A.

The turbocharger 50 has a well-known structure. Specifically, the turbocharger 50 is configured such that a turbine 52 provided in the exhaust passage 33, and a compressor 53 provided in the intake passage 19 are connected by a connecting shaft 51. For the sake of convenience, FIG. 1 illustrates that the turbine 52 and the compressor 53 are separated from each other. Actually, however, the turbine 52 is disposed at one end of the connecting shaft 51, and the compressor 53 is disposed at the other end of the connecting shaft 51. The intake passage 19 and the exhaust passage 33 are in proximity to each other in the vicinity of the installation position of the turbocharger 50. The turbocharger 50 is interposed between the intake passage 19 and the exhaust passage 33.

The turbocharger 50 is disposed at such a position that the axis direction thereof coincides with the cylinder array direction of the engine 1. The turbocharger 50 is accommodated in a supercharger casing 30. The turbocharger 50 drives the compressor 53 when the turbine 52 is rotated by a pressure of exhaust gas We for compressing intake air Wi and increasing an intake pressure (supercharging pressure). The exhaust passage 33 is provided with a waste passage 55 which bypasses the turbine 52 in the turbocharger 50, and a waste gate valve 56 for opening and closing the waste passage 55.

The intake passage 19 is provided with an intake pipe 10, a surge tank 13 disposed downstream of the intake pipe 10, and an intake manifold 14 disposed downstream of the surge tank 13 and including the downstream end thereof connected to an intake side surface of the cylinder head 2. The compressor 53 is provided in the intake pipe 10. An intercooler 11 for cooling intake air is disposed downstream of the compressor 53. A throttle valve 12 for adjusting the intake air amount according to an operating condition of the engine is disposed downstream of the intercooler 11. The intake manifold 14 includes four branch pipes. These branch pipes guide intake air to a first cylinder 4a, a second cylinder 4b, a third cylinder 4c, and a fourth cylinder 4d, which will be described later.

In the cylinder block, the first to fourth cylinders 4a, 4b, 4c, and 4d (these cylinders are referred to as cylinders 4 when generically referred to) are disposed in a row in a state that pistons 70 (see FIG. 2) are reciprocally inserted in the respective cylinders 4. A combustion chamber is formed by inner surfaces of the cylinders 4, top surfaces of the pistons 70, and a bottom surface of the cylinder head 2 facing the top surfaces. The cylinder head 2 has a well-known structure. The cylinder head 2 is provided with a plurality of intake ports 5 for drawing intake air Wi to be supplied from the intake manifold 14 into the combustion chamber, a plurality of exhaust ports 6 (namely, a first exhaust port 6a, a second exhaust port 6bc, and a third exhaust port 6d) for discharging exhaust gas We generated in the combustion chamber to the exhaust passage 33, intake valves 7 for opening and closing the intake ports 5, and exhaust valves 8 for opening and closing the exhaust ports 6. Ignition plugs 9 are disposed at a top portion of the combustion chamber. Fuel injection valves (not illustrated) for directly injecting fuel into the combustion chamber are disposed at appropriate positions.

In the embodiment, each cycle i.e. an intake cycle, a compression cycle, an expansion cycle, and an exhaust cycle is performed at a timing displaced by 180° CA in the order of the first cylinder 4a, the third cylinder 4c, the fourth cylinder 4d, and the second cylinder 4b. In the specification, the term "° CA" denotes a rotational angle (crank angle) of a crankshaft (not illustrated), which is an output shaft of the engine 1.

A variable valve timing mechanism 15i on the intake side, and a variable valve timing mechanism 15e on the exhaust side are mounted on the cylinder head 2. These variable valve timing mechanisms 15i and 15e shift a valve opening timing and a valve closing timing of the intake valves 7 and the exhaust valves 8 in parallel, while keeping the valve opening periods of the intake valves 7 and the exhaust valves 8.

In the embodiment, when the engine 1 is in a predetermined low speed operating range (in an operating range where the amount of exhaust gas acting on the turbine 52 is smaller than a predetermined amount), the valve opening period of the intake valve 7 and the valve opening period of the exhaust valve 8 of each of the cylinders 4 are overlapped by a predetermined overlap period, and the exhaust valve 8 of each of the cylinders 4 is started to open during the overlap period of the other one of the cylinders 4, which is immediately before the target cylinder 4 in terms of the exhaust order.

Specifically, the exhaust valve 8 of the third cylinder 4c is opened during an overlap period of the intake valve 7 and the exhaust valve 8 of the first cylinder 4a. The exhaust valve 8 of the fourth cylinder 4d is opened during an overlap period of the intake valve 7 and the exhaust valve 8 of the third cylinder 4c. The exhaust valve 8 of the second cylinder 4b is opened during an overlap period of the intake valve 7 and the exhaust valve 8 of the fourth cylinder 4d. The exhaust valve 8 of the first cylinder 4a is opened during an overlap period of the intake valve 7 and the exhaust valve 8 of the second cylinder 4b.

The first exhaust port 6a is an exhaust port dedicatedly used for the first cylinder 4a. The first exhaust port 6a is formed to extend from the first cylinder 4a to an exhaust side surface of the cylinder 2 while keeping an independent state thereof. The second exhaust port 6bc is an exhaust port, which is commonly used for the second cylinder 4b and the third cylinder 4c which are not consecutive in terms of the exhaust order. The second exhaust port 6bc includes a branch port 6b extending from the second cylinder 4b, a branch port 6c extending from the third cylinder 4c, and a collective port, which is a merging portion of the downstream ends of the branch ports 6b and 6c. The collective port is opened toward the exhaust side surface of the cylinder head 2. The third exhaust port 6*d* is an exhaust port dedicatedly used for the fourth cylinder 4*d*. The third exhaust port 6*d* is formed to extend from the fourth cylinder 4*d* to the exhaust side surface of the cylinder 2 while keeping an independent state thereof.

The exhaust passage 33 is provided with a block-shaped exhaust manifold 20 connected to the exhaust side surface of the cylinder head 2, and the supercharger casing 30 connected to a downstream surface of the exhaust manifold 20.

Figure 2:
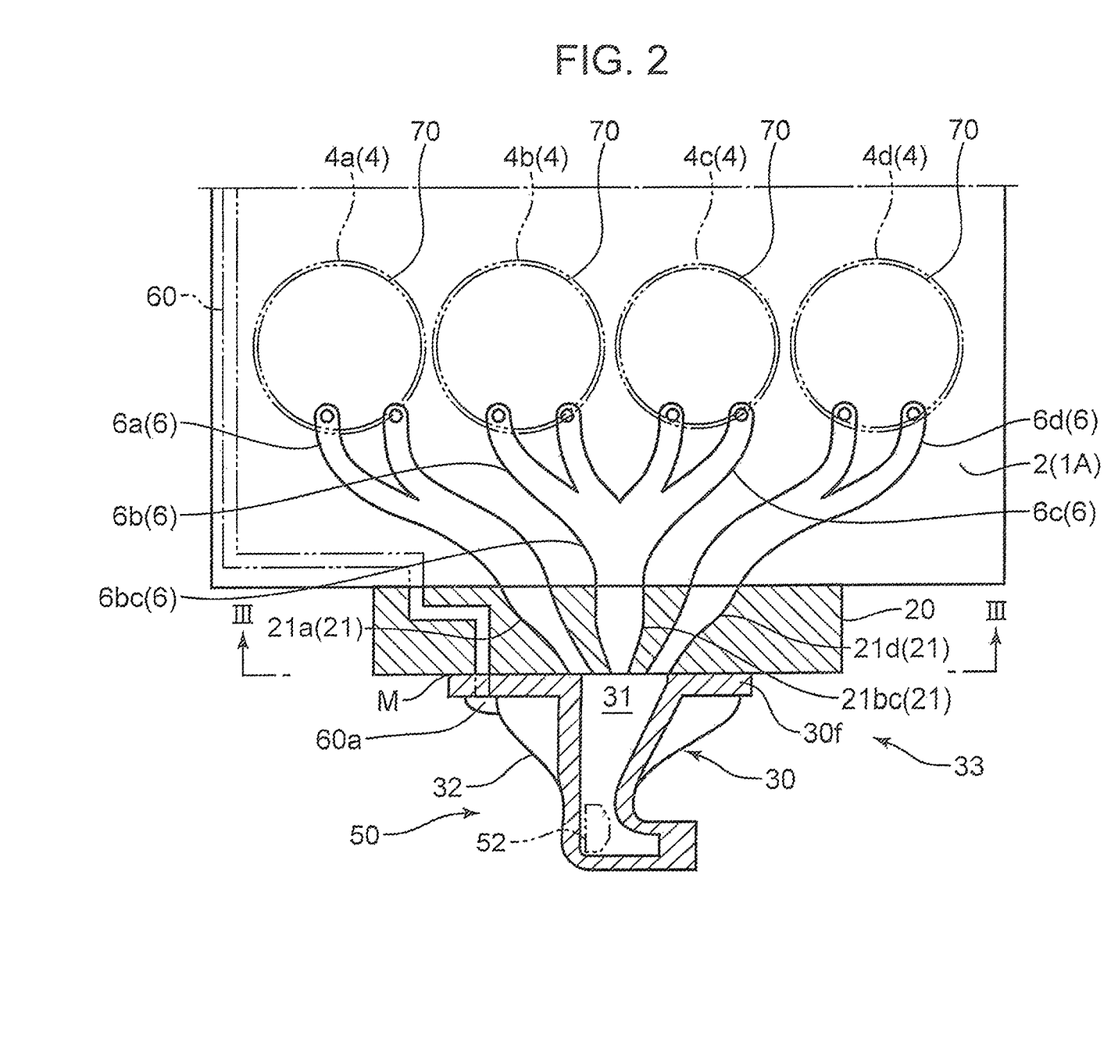
FIG. 2 is a diagram illustrating a configuration of a cylinder head, an exhaust manifold, and a supercharger casing of the engine.
Figure 3:
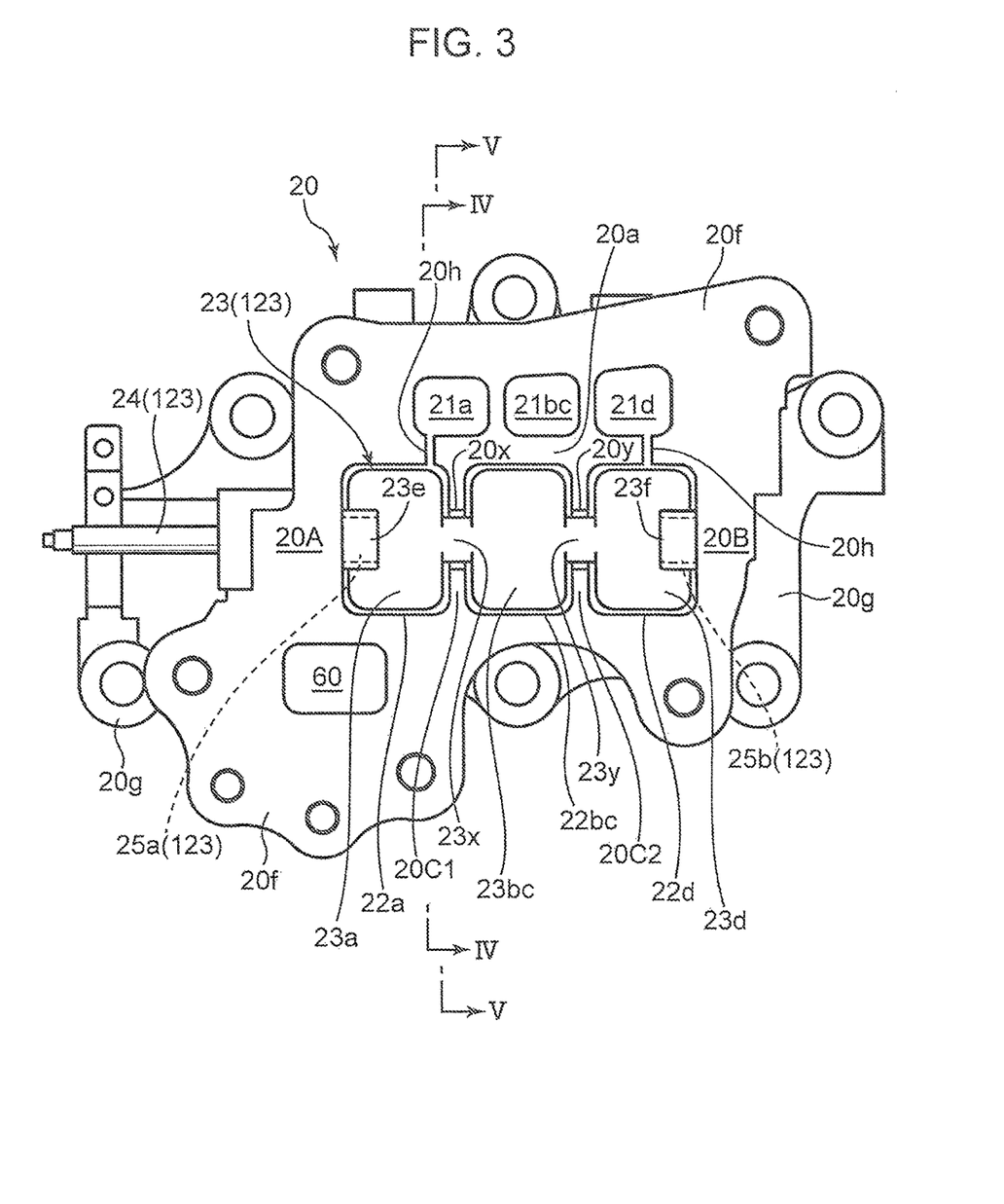
FIG. 3 is an arrow view (sectional view) taken along the line III-III in FIG. 2.

The exhaust manifold 20 is internally formed with a low-speed passage 21 (corresponding to a first exhaust passage of the present invention) illustrated in FIG. 2 and FIG. 3, and a high-speed passage 22 (corresponding to a second exhaust passage of the present invention) illustrated in FIG. 1 and FIG. 3. The low-speed passage 21 and the high-speed passage 22 are formed to pass through the exhaust manifold 20 in a state that the low-speed passage 21 and the high-speed passage 22 are partitioned into upper and lower two sections via a partition wall 20*a* to be described later.

As illustrated in FIG. 2 and FIG. 3, the low-speed passage 21 includes a first low-speed independent passage 21*a*, a second low-speed independent passage 21*bc*, and a third low-speed independent passage 21*d*. The first to third low-speed independent passages 21*a*, 21*bc*, and 21*d* (corresponding to independent passages of the present invention) are disposed in this order in the cylinder array direction. As illustrated in FIG. 1 and FIG. 3, the high-speed passage 22 includes a first high-speed independent passage 22*a*, a second high-speed independent passage 22*bc*, and a third high-speed independent passage 22*d* (corresponding to independent passages of the present invention). The first to third high-speed independent passages 22*a*, 22*bc*, and 22*d* are disposed in this order in the cylinder array direction.

Figure 4:
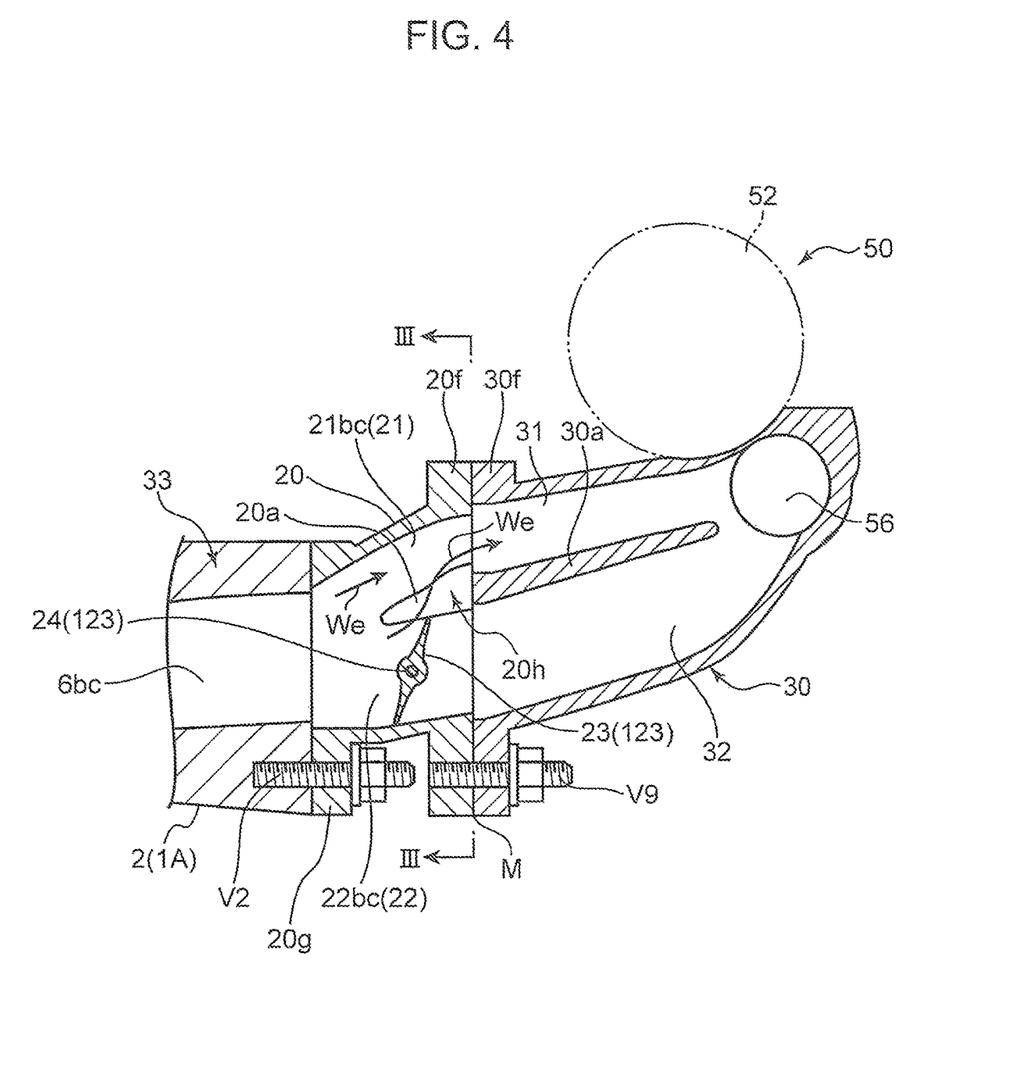
FIG. 4 is an arrow view (sectional view) taken along the line IV-IV in FIG. 3.

As illustrated in FIG. 3 and FIG. 4, the exhaust manifold 20 includes a mounting flange 20*g* on an upstream surface thereof. The exhaust manifold 20 is connected to the cylinder head 2 by the mounting flange 20*g* and a fastening member V2 (an engine-side stud bolt and nut). In the connected state, the upstream ends of the first to third low-speed independent passages 21*a*, 21*bc*, and 21*d*, and the upstream ends of the first to third high-speed independent passages 22*a*, 22*bc*, and 22*d* are respectively connected to the downstream ends of the first to third exhaust ports 6*a*, 6*bc*, and 6*d*.

More specifically, the upstream end of the first low-speed independent passage 21*a* and the upstream end of the first high-speed independent passage 22*a* are merged, and the merging portion is communicated with the downstream end of the first exhaust port 6*a* for the first cylinder 4*a*. Further, the upstream end of the second low-speed independent passage 21*bc* and the upstream end of the second high-speed independent passage 22*bc* are merged, and the merging portion is communicated with the downstream end of the second exhaust port 6*bc* for the second and third cylinders 4*b* and 4*c*. Furthermore, the upstream end of the third low-speed independent passage 21*d* and the upstream end of the third high-speed independent passage 22*d* are merged, and the merging portion is communicated with the downstream end of the third exhaust port 6*d* for the fourth cylinder 4*d*.

The first to third low-speed independent passages 21*a*, 21*bc*, and 21*d*, and the first to third high-speed independent passages 22*a*, 22*bc*, and 22*d* are separated (partitioned) from each other into upper and lower two sections by the partition wall 20*a* (see FIG. 3 to FIG. 5) extending along the flow direction of exhaust gas We. As illustrated in FIG. 3, the flow area of exhaust gas in the first to third low-speed independent passages 21*a*, 21*bc*, and 21*d* in the upper section is set to a small value, as compared with the first to third high-speed independent passages 22*a*, 22*bc*, and 22*d* in the lower section. The partition wall 20*a* is an area from a portion between the first low-speed independent passage 21*a* and the first high-speed independent passage 22*a* to a portion between the third low-speed independent passage 21*d* and the third high-speed independent passage 22*d* in the cylinder array direction.

The partition wall 20*a* partitions the first low-speed independent passage 21*a* and the first high-speed independent passage 22*a* from each other, partitions the second low-speed independent passage 21*bc* and the second high-speed independent passage 22*bc* from each other, and partitions the third low-speed independent passage 21*d* and the third high-speed independent passage 22*d* from each other. In the following description, a portion of the partition wall 20*a* that partitions the first low-speed independent passage 21*a* and the first high-speed independent passage 22*a* from each other is referred to as a left portion of the partition wall 20*a*, a portion of the partition wall 20*a* that partitions the second low-speed independent passage 21*bc* and the second high-speed independent passage 22*bc* from each other is referred to as a middle portion of the partition wall 20*a*, and a portion of the partition wall 20*a* that partitions the third low-speed independent passage 21*d* and the third high-speed independent passage 22*d* from each other is referred to as a right portion of the partition wall 20*a*.

As illustrated in FIG. 3, the left portion of the partition wall 20*a* includes a slit 20*h* for communicating between the first low-speed independent passage 21*a* and the first high-speed independent passage 22*a*, and the right portion of the partition wall 20*a* includes a slit 20*h* for communicating between the third low-speed independent passage 21*d* and the third high-speed independent passage 22*d*. In the following description, the former slit 20*h* is also referred to as a left slit 20*h*, and the latter slit 20*h* is also referred to as a right slit 20*h*. In the example illustrated in FIG. 3, the middle portion of the partition wall 20*a* does not have a slit 20*h*. The slit 20*h* is an example of a cutout portion of the present invention.

FIG. 4 is a sectional view taken along the line IV-IV passing the slit 20*h* in FIG. 3. The slit 20*h* is a cutout portion extending in the flow direction of exhaust gas We (in the right direction in FIG. 4) from the upstream end of the partition wall 20*a* in the flow direction. In the example illustrated in FIG. 4, the slit 20*h* is formed through the partition wall 20*a* in the flow direction of exhaust gas We, namely, from the upstream end of the partition wall 20*a* to the downstream end thereof, and is formed through the partition wall 20*a* in the up-down direction. In other words, the left portion of the partition wall 20*a* is isolated in the cylinder array direction and in the flow direction of exhaust gas We (in the direction in which the first to third high-speed independent passages 22*a*, 22*bc*, and 22*c* are arranged, or in the direction in which the first to third low-speed independent passages 21*a*, 21*bc*, and 21*d* are arranged) by the left slit 20*h*; and the right portion of the partition wall 20*a* is isolated in the cylinder array direction and in the flow direction of exhaust gas We by the right slit 20*h*. The slits 20*h* are linearly formed in the flow direction of exhaust gas We in plan view.

As illustrated in FIG. 2, the downstream ends of the first to third low-speed independent passages 21*a*, 21*bc*, and 21*d* are formed into a tapered shape in such a manner that the flow area of exhaust gas gradually decreases toward the downstream side. On the other hand, as illustrated in FIG. 1, the downstream ends of the first to third high-speed independent passages 22a, 22bc, and 22d are not formed into a tapered shape.

As illustrated in FIG. 2, the downstream ends of the first to third low-speed independent passages 21a, 21bc, and 21d come close to each other in such a manner that tip ends thereof are merged toward the center of the exhaust manifold 20 in the cylinder array direction. Likewise, as illustrated in FIG. 1, the downstream ends of the first to third high-speed independent passages 22a, 22bc, and 22d come close to each other in such a manner that tip ends thereof are merged toward the center of the exhaust manifold 20 in the cylinder array direction.

Figure 5:
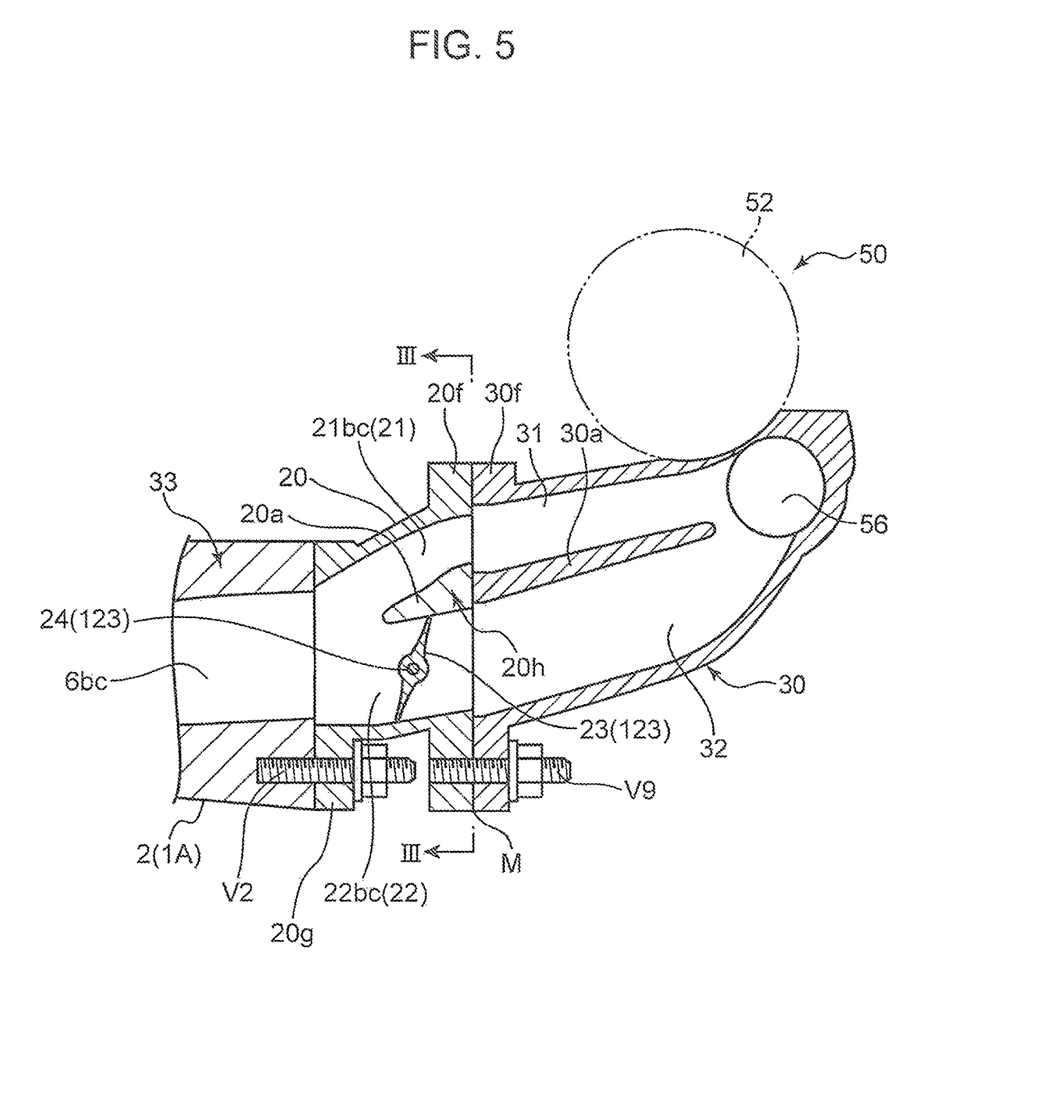
FIG. 5 is an arrow view (sectional view) taken along the line V-V in FIG. 3.

As illustrated in FIG. 1. FIG. 3, and FIG. 4, a variable exhaust valve 123 (corresponding to a valve of the present invention) is disposed in the first to third high-speed independent passages 22a, 22bc, and 22d. The variable exhaust valve 123 adjusts the flow rate of exhaust gas We flowing through the first to third high-speed independent passages 22a, 22bc, and 22d. Specifically, the variable exhaust valve 123 is driven to open the first to third high-speed independent passages 22a, 22bc, and 22d in an operating range where the amount of exhaust gas acting on the turbine 52 is equal to or larger than a predetermined amount (controlling to open the variable exhaust valve 123), and driven to close the first to third high-speed independent passages 22a, 22bc, and 22d in an operating range where the amount of exhaust gas acting on the turbine 52 is smaller than the predetermined amount (controlling to close the variable exhaust valve 123; see FIG. 4 and FIG. 5). FIG. 5 is a sectional view taken along the line V-V, which does not pass the slit 20h in FIG. 3. A structure of the variable exhaust valve 123 will be described later.

As illustrated in FIG. 1, FIG. 2, and FIG. 4, the upstream end of a low-speed exhaust introduction passage 31 (see FIG. 2 and FIG. 4) is connected to the downstream ends of the first to third low-speed independent passages 21a, 21bc, and 21d, and the upstream end of a high-speed exhaust introduction passage 32 (see FIG. 1 and FIG. 4) is connected to the downstream ends of the first to third high-speed independent passages 22a, 22bc, and 22d. The low-speed exhaust introduction passage 31 collects exhaust gas We to be ejected from the first to third low-speed independent passages 21a, 21bc, and 21d, and the high-speed exhaust introduction passage 32 collects exhaust gas We to be ejected through the first to third high-speed independent passages 22a, 22bc, and 22d. In other words, the low-speed exhaust introduction passage 31 is a common passage communicating with the downstream ends of the first to third low-speed independent passages 21a, 21bc, and 21d, and the high-speed exhaust introduction passage 32 is a common passage communicating with the downstream ends of the first to third high-speed independent passages 22a, 22bc, and 22d.

As illustrated in FIG. 4 and FIG. 5, the supercharger casing 30 includes a mounting flange 30f on the upstream surface thereof. The supercharger casing 30 is connected to the downstream surface of the exhaust manifold 20 (mounting flange 20f) by the mounting flange 30f and a fastening member V9 (a supercharger-side stud bolt and nut).

The supercharger casing 30 is internally formed with the low-speed exhaust introduction passage 31 illustrated in FIG. 2 and FIG. 4, and the high-speed exhaust introduction passage 32 illustrated in FIG. 1 and FIG. 4.

The low-speed exhaust introduction passage 31 and the high-speed exhaust introduction passage 32 are separated (partitioned) from each other into upper and lower two sections by a partition wall 30a (see FIG. 4 and FIG. 5) extending along the flow direction of exhaust gas We. The flow area of exhaust gas in the low-speed exhaust introduction passage 31 in the upper section is set to a small value, as compared with the high-speed exhaust introduction passage 32 in the lower section.

The low-speed exhaust introduction passage 31 and the high-speed exhaust introduction passage 32 are passages for introducing exhaust gas We from the engine body 1A side to the turbine 52 in the turbocharger 50. A portion of each of the low-speed exhaust introduction passage 31 and the high-speed exhaust introduction passage 32 on the engine body 1A side is widened in the cylinder array direction.

As illustrated in FIG. 4 and FIG. 5, when the variable exhaust valve 123 is closed by valve control, exhaust gas We is introduced to the turbine 52 through the first to third low-speed independent passages 21a, 21bc, and 21d, and through the low-speed exhaust introduction passage 31. When the variable exhaust valve 123 is opened, exhaust gas We is introduced to the turbine 52 through the first to third high-speed independent passages 22a, 22bc, and 22d, and through the high-speed exhaust introduction passage 32, as well as through the first to third independent low-speed passages 21a, 21bc, and 21d, and through the low-speed exhaust introduction passage 31. In other words, the first to third low-speed independent passages 21a, 21bc, and 21d, and the low-speed exhaust introduction passage 31 are passages through which exhaust gas We is constantly allowed to flow regardless of whether the engine speed is high or low; and the first to third high-speed independent passages 22a, 22bc, and 22d, and the high-speed exhaust introduction passage 32 are passages through which exhaust gas We is allowed to flow only when the amount of exhaust gas acting on the turbine 52 is equal to or larger than a predetermined amount.

According to the aforementioned configuration, when the engine 1 is in a low speed operating range where the amount of exhaust gas acting on the turbine 52 is smaller than the predetermined amount, the flow area of exhaust gas in the first to third low-speed independent passages 21a, 21bc, and 21d and in the low-speed exhaust introduction passage 31 is relatively small by controlling to close the variable exhaust valve 123. Therefore, the flow rate of exhaust gas We in the first to third low-speed independent passages 21a, 21bc, 21d, and in the low-speed exhaust introduction passage 31 increases, and the flow rate of exhaust gas We acting on the turbine 52 increases. In other words, a dynamic supercharging effect by a dynamic supercharging system is enhanced. As a result, a supercharging pressure in a low speed operating range increases.

On the other hand, when the engine 1 is in a high speed operating range where the amount of exhaust gas acting on the turbine 52 is equal to or larger than the predetermined amount, the amount of exhaust gas We to be introduced to the turbine 52 increases. Further, by opening the variable exhaust valve 123, it is possible to drive the turbocharger 50, while preventing a drawback that the variable exhaust valve 123 becomes an exhaust resistance.

In the embodiment, when the amount of exhaust gas acting on the turbine 52 is smaller than a predetermined amount, in other words, when the engine 1 is in a low speed operating range where the variable exhaust valve 123 is closed by valve control, as described above, the valve opening periods of the intake valve 7 and the exhaust valve 8 of each of the cylinders 4 are overlapped, and the exhaust valve 8 of each of the cylinders 4 is opened during an overlap period of the other one of the cylinders 4, which is immediately before the target cylinder 4 in terms of the exhaust order.

According to the aforementioned configuration, in a low speed operating range where the amount of exhaust gas acting on the turbine 52 is smaller than a predetermined amount, scavenging by a so-called ejector effect is promoted. Specifically, when the engine 1 is in a low speed operating range, only the first to third low-speed independent passages 21a, 21bc, and 21d whose flow area of exhaust gas is relatively small are opened by controlling to close the variable exhaust valve 123. Therefore, the flow rate of exhaust gas We (blowdown gas) in the first to third low-speed independent passages 21a, 21bc, and 21d to be discharged immediately after opening of the exhaust valve 8 increases. Further, the downstream ends of the first to third low-speed independent passages 21a, 21bc, and 21d have a tapered shape. Therefore, the speed of exhaust gas We to be ejected from the downstream ends of the first to third low-speed independent passages 21a, 21bc, and 21d into the low-speed exhaust introduction passage 31 as a collective passage increases. As described above, a strong negative pressure by an ejector effect is generated in the periphery of blowdown gas ejected at a high speed into the low-speed exhaust introduction passage 31. When a strong negative pressure is generated in the low-speed exhaust introduction passage 31 by blowdown gas from a certain cylinder 4, the intake valve 7 and the exhaust valve 8 of the other one of the cylinders 4 (preceding cylinder 4), which is immediately before the certain cylinder 4 in terms of the exhaust order are in an overlap period. Therefore, residual gas in the preceding cylinder 4 is sucked toward the exhaust side by a negative pressure operation by the ejector effect. This promotes scavenging of residual gas. In other words, an ejector effect by a dynamic exhaust system is enhanced. As a result, the intake air amount of the preceding cylinder 4 increases (dynamic exhaust effect).

Further, exhaust gas We sucked from the preceding cylinder 4 by the ejector effect is added. Therefore, the flow rate of exhaust gas We acting on the turbine 52 increases. This is also advantageous in promoting the dynamic supercharging effect (increasing a driving force of the turbine 52), and in increasing the supercharging pressure in a low speed operating range.

The aforementioned configuration is described in details in the following. Specifically, when the variable exhaust valve 123 is fully opened, an ejector effect is not obtained. In this state, blowdown gas to be ejected from the first to third low-speed independent passages 21a, 21bc, and 21d, and from the first to third high-speed independent passages 22a, 22bc, and 22d flows (flows back) to another passage via the low-speed exhaust introduction passage 31 and via the high-speed exhaust introduction passage 32. This provides the same effect as the effect of increasing the volume of the exhaust passage 33. On the other hand, when an ejector effect by controlling to close the variable exhaust valve 123 is obtained, blowdown gas to be ejected from the first to third low-speed independent passages 21a, 21bc, and 21d sucks exhaust gas We from another passage, and there is no backflow as described above. This provides the same effect as the effect of decreasing the volume of the exhaust passage 33 in a dynamic supercharging system. Therefore, when the engine 1 is in a low speed operating range, valve control of the variable exhaust valve 123 in a dynamic supercharging system makes it possible to obtain a dynamic supercharging effect by reduction of the volume of the exhaust passage 33, and to promote the aforementioned dynamic supercharging effect by an ejector effect of a dynamic exhaust system.

In FIG. 1 and FIG. 2, the reference numeral 60 denotes an EGR passage which communicates between the exhaust passage 33 and the intake passage 19 in order to perform exhaust gas recirculation (EGR) of allowing a part of exhaust gas We flowing through the exhaust passage 33 to recirculate to the intake passage 19. An entrance portion 60a of the EGR passage 60 on the side of the exhaust passage 33 is opened toward the downstream side of the variable exhaust valve 123 in the high-speed exhaust introduction passage 32. An exit portion 60b of the EGR passage 60 on the side of the intake passage 19 is opened between the throttle valve 12 and the surge tank 13. The EGR passage 60 is provided with an EGR cooler 61 for cooling gas passing through the EGR passage 60, and an EGR valve 62 for opening and closing the EGR passage 60. In the embodiment, an upstream portion of the EGR passage 60 is formed in the exhaust manifold 20 and in the cylinder head 2.

As described above, in the embodiment, the variable exhaust valve 123 is used for a dynamic exhaust system and a dynamic supercharging system provided in the exhaust passage 33 of the engine 1. Next, a structure of the variable exhaust valve 123 is described referring to FIG. 3.

The variable exhaust valve 123 is provided with a valve body 23, a pair of first and second tubular-shaped bush members 25a and 25b, and a columnar-shaped shaft member 24. The valve body 23 includes a first butterfly valve 23a, a second butterfly valve 23bc, and a third butterfly valve 23d; and a first stem portion 23x for connecting between the first and second butterfly valves 23a and 23bc, and a second stem portion 23y for connecting between the second and third butterfly valves 23bc and 23d. The first and second bush members 25a and 25b are respectively fixed to a first side wall portion 20A of the exhaust manifold 20 on one side in the cylinder array direction, and to a second side wall portion 20B of the exhaust manifold 20 on the other side in the cylinder array direction. Further, the first and second bush members 25a and 25b rotatably support the valve body 23 at both ends of the valve body 23 in the axis direction thereof (in a direction orthogonal to a direction in which the low-speed passage 21 and the high-speed passage 22 are arranged, namely, in the cylinder array direction). The shaft member 24 passes through the first bush member 25a and through the first side wall portion 20A in the axis direction. Further, the shaft member 24 projects from the first bush member 25a through a portion of the valve body 23 on the side of the first butterfly valve 23a by a predetermined length. The shaft member 24 is connected to the valve body 23 at the projected portion of the shaft member 24 in a state that relative rotation of the shaft member 24 with respect to the valve body 23 is disabled. A portion of the shaft member 24 projecting outwardly (toward the left side in FIG. 3) from the first side wall portion 20A is engaged with an unillustrated actuator. The shaft member 24 is rotated by an operation of the actuator. The valve body 23 is opened and closed, as the shaft member 24 is rotated.

First and second hollow boss portion 23e and 23f are integrally formed at both ends of the valve body 23 for receiving the first and second bush members 25a and 25b. The first and second boss portions 23e and 23f are respectively and rotatably supported on the bush members 25a and 25b.

The variable exhaust valve 123 is disposed below the partition wall 20a on the upstream side of a joint surface portion M between the upstream-side exhaust manifold 20 and the downstream-side supercharger casing 30 constituting the exhaust passage 33 of the engine 1 (see FIG. 4 and FIG. 5). The variable exhaust valve 123 is rotated around the shaft member 24, as the shaft member 24 is rotated. When the variable exhaust valve 123 is in a closed state, the variable exhaust valve 123 is disposed in an inclined state in such a manner that an end of the variable exhaust valve 123 on the side of the low-speed passage 21 (on the upper side in FIG. 4 and FIG. 5) is located on the downstream side in the flow direction of exhaust gas We (on the right side in FIG. 4 and FIG. 5) than an end of the variable exhaust valve 123 on the side opposite to the low-speed passage 21 (on the lower side in FIG. 4 and FIG. 5).

The first stem portion 23x of the valve body 23 is inserted in a stem insertion hole 20x passing through a high-speed passage partition wall 20C1, which is formed between the first high-speed independent passage 22a and the second high-speed independent passage 22bc of the exhaust manifold 20, and which partitions the first and second high-speed independent passages 22a and 22bc from each other. The second stem portion 23y of the valve body 23 is inserted in a stem insertion hole 20y passing through a high-speed passage partition wall 20C2, which is formed between the second high-speed independent passage 22bc and the third high-speed independent passage 22d of the exhaust manifold 20, and which partitions the second and third high-speed independent passages 22bc and 22d from each other (see FIG. 3).

More specifically, the valve body 23 is integrally formed of heat-resistant steel. The first butterfly valve 23a disposed in the first high-speed independent passage 22a of the exhaust manifold 20, the tubular-shaped first stem portion 23x, the second butterfly valve 23bc disposed in the second high-speed independent passage 22bc, the tubular-shaped second stem portion 23y, and the third butterfly valve 23d disposed in the third high-speed independent passage 22d are arranged in this order from one end side of the valve body 23 (from the left side in FIG. 3) in the axis direction. The first and second stem portions 23x and 23y are coaxially formed on the valve body 23. The first to third butterfly valves 23a, 23bc, and 23d are formed in such a manner that an axial center portion of the valve body 23 has a large thickness. The surfaces of the first and second stem portions 23x and 23y, and the surfaces of the first to third butterfly valves 23a, 23bc, and 23d are smoothly continued to each other. The first boss portion 23e is integrally formed on a lateral portion of the first butterfly valve 23a constituting one end of the valve body 23. The second boss portion 23f is integrally formed on a lateral portion of the third butterfly valve 23d constituting the other end of the valve body 23.

Advantageous Effects of the Embodiment

According to the embodiment, the slits 20h are formed in the partition wall 20a. Therefore, even if thermal expansion occurs in the partition wall 20a, thermal stress due to the thermal expansion is absorbed by the slits 20h. This makes it possible to prevent breakage or damage of the partition wall 20a by thermal stress. Further, even if the valve body 23 is rendered unmovable in a closed state due to thermal distortion of the partition wall 20a or a peripheral portion thereof, or the like, it is possible to suppress deterioration of the traveling performance in a high speed operating range.

More specifically, when the valve body 23 is rendered unmovable in a closed state, exhaust gas We that has reached the vicinity of the valve body 23 from the engine body 1A is allowed to flow to the low-speed passage 21 (in FIG. 4, only the second low-speed independent passage 21bc is illustrated) through the slits 20h when the vehicle is in a high-speed operating range. Therefore, stagnation of exhaust gas We on the upstream side of the valve body 23 is less likely to occur. Consequently, it is possible to prevent combustion failure in a combustion chamber of the engine body 1A. This makes it possible to suppress deterioration of the traveling performance in a high speed operating range, while keeping the traveling performance in a low speed operating range.

Further, the slits 20h are formed to extend from the upstream end of the partition wall 20a toward the downstream side in the flow direction of exhaust gas We. This makes it easy to absorb thermal stress on the partition wall 20a by the slits 20h. This is advantageous in preventing breakage or damage of the partition wall 20a by thermal stress. Further, the slits 20h can be easily formed by a cutting process or the like. In other words, the advantageous effects of preventing breakage or damage of the partition wall 20a as described above can be obtained with a simplified configuration i.e. formation of the slits 20h.

Further, according to the embodiment, only the left portion of the partition wall 20a and the right portion of the partition wall 20a have a slit 20h. Therefore, it is possible to obtain the effect of preventing breakage or damage of the partition wall 20a by a less number of slits 20h. In other words, thermal stress is likely to occur on both ends of the partition wall 20a in the cylinder array direction (in a direction in which the first to third high-speed independent passages 22a, 22bc, and 22d are arranged). Therefore, forming the slits 20h in both ends of the partition wall 20a is advantageous in obtaining the effect of preventing breakage or damage of the partition wall 20a.

Further, according to the embodiment, the first to third butterfly valves 23a, 23bc, and 23d are inclined in such a manner that an end of the first to third butterfly valves 23a, 23bc, and 23d on the side of the low-speed passage 21 is located on the downstream side in the flow direction of exhaust gas We than an end of the first to third butterfly valves 23a, 23bc, and 23d on the side opposite to the low-speed passage 21 (see FIG. 4). Therefore, exhaust gas We that has reached the first to third butterfly valves 23a. 23bc, and 23d from the engine body 1A is smoothly guided to the slits 20h by the first to third butterfly valves 23a, 23bc, and 23d (see FIG. 4), and is guided toward the low-speed passage 21 through the slits 20h. This is advantageous in securely suppressing deterioration of the traveling performance in a high speed operating range when the first to third butterfly valves 23a. 23bc, and 23d are rendered unmovable in a closed state.

In the embodiment, three low-speed passages and three high-speed passages are formed. Alternatively, four or more low-speed passages and four or more high-speed passages may be formed. In any case, it is possible to form the slits 20h in both ends of the partition wall 20a in the cylinder array direction.

Further, in the embodiment, the slits 20h are formed only in both ends of the partition wall 20a in the cylinder array direction. In addition to the above, a slit 20h may be formed in the middle portion of the partition wall 20a.

Further, in the example illustrated in FIG. 4, the slits 20h are formed through the partition wall 20a in the flow direction of exhaust gas We (from the upstream end of the partition wall 20a to the downstream end thereof). The partition wall 20a may be formed with a communication portion for communicating between the low-speed passage 21 and the high-speed passage 22. Namely, a slit may be formed only in a part of the partition wall 20a in the flow direction of exhaust gas We, in place of the slits 20h. Examples of the slit are a slit which is formed only in an upstream portion of the partition wall 20a in the flow direction of exhaust gas We, a slit which is formed only in a middle portion of the partition wall 20a in the flow direction, and a slit which is formed only in a downstream portion of the partition wall 20a in the flow direction.

Further, the communication portion may be a hole of a circular shape or a semicircular shape in plan view, in place of the slits 20h.

SUMMARY OF EMBODIMENT

The following is a summary of the features and the advantageous effects of the exhaust device for an engine disclosed in the embodiment.

The exhaust device for an engine disclosed in the embodiment is an exhaust device for an engine, interposed between an engine body, and a supercharger to be driven by a pressure of exhaust gas to be discharged from the engine body. The exhaust device includes a first exhaust passage and a second exhaust passage which introduce exhaust gas to the supercharger; a partition wall formed between the first exhaust passage and the second exhaust passage, and configured to partition the first exhaust passage and the second exhaust passage from each other; and a valve disposed within the second exhaust passage, and configured to adjust a flow rate of exhaust gas flowing through the second exhaust passage. The partition wall includes a communication portion for communicating between the first exhaust passage and the second exhaust passage.

In the exhaust device for an engine, the communication portion is formed in the partition wall. This makes it possible to absorb thermal stress due to thermal expansion by the communication portion, even when the thermal expansion occurs in the partition wall. This is advantageous in preventing breakage or damage of the partition wall by thermal stress. Further, even when the valve is rendered unmovable in a closed state due to thermal distortion of the partition wall or a peripheral portion thereof, or the like, it is possible to suppress lowering of the traveling performance in a high speed operating range. More specifically, when the valve is rendered unmovable in a closed state, exhaust gas that has reached the vicinity of the valve from the engine body is allowed to flow to the first exhaust passage through the communication portion when a vehicle is in a high speed operating range. Therefore, stagnation of exhaust gas on the upstream side of the valve is less likely to occur. Consequently, it is possible to prevent combustion failure in a combustion chamber of the engine body. This makes it possible to suppress deterioration of the traveling performance in a high speed operating range, while keeping the traveling performance in a low speed operating range.

In the exhaust device for an engine, preferably, the communication portion may be a cutout portion extending in a flow direction of exhaust gas from an upstream end of the partition wall in the flow direction.

The cutout portion of the present invention is an example of a communication portion. An example of the cutout portion is a slit. According to the aforementioned configuration, the communication portion is a cutout portion that is formed from the upstream end of the partition wall in the flow direction of exhaust gas toward the downstream side. This makes it easy to absorb thermal stress on the partition wall by the communication portion. This is advantageous in obtaining an effect of preventing breakage or damage of the partition wall by thermal stress.

In the exhaust device for an engine, preferably, the cutout portion may extend from the upstream end of the partition wall to a downstream end of the partition wall.

According to the aforementioned configuration, thermal stress due to thermal expansion of the partition wall is further advantageously absorbed by the cutout portion. This is advantageous in obtaining the aforementioned effect of preventing breakage or damage of the partition wall.

In the exhaust device for an engine, preferably, the engine body may include a plurality of cylinders, and pistons which reciprocate within the respective cylinders. Each of the first exhaust passage and the second exhaust passage may include a plurality of independent passages communicating with the plurality of the cylinders. The plurality of the independent passages of the first exhaust passage and the plurality of the independent passages of the second exhaust passage may be respectively disposed in a row in a cylinder array direction. The communication portion may be formed in both ends of the partition wall formed between the first exhaust passage and the second exhaust passage in the cylinder array direction.

In the aforementioned configuration, the partition wall is an area from a portion between an independent passage located at an end out of the plurality of the independent passages of the first exhaust passage and an independent passage located at an end out of the plurality of the independent passages of the second exhaust passage, to a portion between an independent passage located at the other end out of the plurality of the independent passages of the first exhaust passage and an independent passage located at the other end out of the plurality of the independent passages of the second exhaust passage in the cylinder array direction.

According to the aforementioned configuration, it is possible to obtain the aforementioned effect of preventing breakage or damage of the partition wall by the communication portions of a less number. In other words, thermal stress on the partition wall is likely to occur on both ends of the partition wall in the cylinder array direction. Therefore, forming the communication portion in both ends of the partition wall is advantageous in obtaining the effect of preventing breakage or damage of the partition wall.

In the exhaust device for an engine, preferably, the valve may be a butterfly valve which rotates around an axis thereof extending in a direction orthogonal to a direction in which the first exhaust passage and the second exhaust passage are arranged. The butterfly valve may be disposed in an inclined state in such a manner that an end of the butterfly valve on a side of the first exhaust passage is located on a downstream side in a flow direction of exhaust gas than an end of the butterfly valve on a side opposite to the first exhaust passage.

According to the aforementioned configuration, the butterfly valve is inclined in such a manner that the end of the butterfly valve on the side of the first exhaust passage is located on the downstream side in the flow direction of exhaust gas than the end of the butterfly valve on the side opposite to the first exhaust passage. This makes it possible to smoothly guide exhaust gas that has reached the butterfly valve from the engine body to the communication portion by the butterfly valve, and to guide the exhaust gas to the first exhaust passage through the communication portion. This is advantageous in securely suppressing lowering of the traveling performance in a high speed operating range when the valve is rendered unmovable in a closed state.

This application is based on Japanese Patent Application No. 2015-165008 filed on Aug. 24, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust device for an engine, interposed between an engine body, and a supercharger to be driven by a pressure of exhaust gas to be discharged from the engine body, the exhaust device comprising:
   a first exhaust passage and a second exhaust passage which introduce exhaust gas to the supercharger, a cross-sectional area of the first exhaust passage being smaller than a cross-sectional area of the second exhaust passage;
   a partition wall formed between the first exhaust passage and the second exhaust passage, and configured to partition the first exhaust passage and the second exhaust passage from each other; and
   a valve disposed within the second exhaust passage, and configured to adjust a flow rate of exhaust gas flowing through the second exhaust passage, wherein
   the partition wall includes a communication passage for communicating between the first exhaust passage and the second exhaust passage, and the communication passage connects the first exhaust passage to the second exhaust passage when the valve is closed, the communication passage extending along a line that extends from the first exhaust passage to the second exhaust passage, the communication passage having a maximum width in a direction transverse to the line, and the maximum width of the communication passage is less than a maximum width of the first exhaust passage in the direction transverse to the line and less than a maximum width of the second exhaust passage in the direction transverse to the line.

2. The exhaust device for an engine according to claim 1, wherein
   the communication passage is a cutout portion extending in a flow direction of exhaust gas from an upstream end of the partition wall in the flow direction.

3. The exhaust device for an engine according to claim 2, wherein
   the cutout portion extends from the upstream end of the partition wall to a downstream end of the partition wall.

4. The exhaust device for an engine according to claim 1, wherein
   the engine body includes a plurality of cylinders, and pistons which reciprocate within the respective cylinders,
   each of the first exhaust passage and the second exhaust passage includes a plurality of independent passages communicating with the plurality of the cylinders,
   the plurality of the independent passages of the first exhaust passage and the plurality of the independent passages of the second exhaust passage are respectively disposed in a row in a cylinder array direction, and
   the communication passage is formed in both ends of the partition wall formed between the first exhaust passage and the second exhaust passage in the cylinder array direction.

5. The exhaust device for an engine according to claim 1, wherein
   the valve is a butterfly valve which rotates around an axis thereof extending in a direction orthogonal to a direction in which the first exhaust passage and the second exhaust passage are arranged, and
   the butterfly valve is disposed in an inclined state in such a manner that an end of the butterfly valve on a side of the first exhaust passage is located on a downstream side in a flow direction of exhaust gas than an end of the butterfly valve on a side opposite to the first exhaust passage.

6. The exhaust device for an engine according to claim 1, wherein a length of the communication passage along the line extending from the first exhaust passage to the second exhaust passage is greater than the maximum width of the communication passage.

7. The exhaust device according to claim 1, wherein the communication passage is formed at an outer peripheral location of the valve.

8. An engine, comprising:
   an engine body;
   a turbocharger;
   a valve; and
   an exhaust manifold interposed between the engine body and the turbocharger, the exhaust manifold having a first exhaust passage, a second exhaust passage, and a partition wall, the first exhaust passage and the second exhaust passage being positioned to introduce exhaust gas from the engine body to the turbocharger, the valve being disposed within the second exhaust passage and configured to adjust a flow rate of exhaust gas flowing through the second exhaust passage, a cross-sectional area of the first exhaust passage being smaller than a cross-sectional area of the second exhaust passage, the partition wall being positioned between the first exhaust passage and the second exhaust passage to separate the first exhaust passage and the second exhaust passage from each other, the partition wall including a communication passage positioned between the first exhaust passage and the second exhaust passage, and the communication passage connects the first exhaust passage to the second exhaust passage when the valve is closed.

9. The engine according to claim 8, wherein the communication passage is formed at an outer peripheral location of the valve.

10. The engine according to claim 8, wherein
    the communication passage is a cutout portion extending in a flow direction of exhaust gas from an upstream end of the partition wall in the flow direction.

11. The engine according to claim 10, wherein
    the cutout portion extends from the upstream end of the partition wall to a downstream end of the partition wall.

12. The engine according to claim 8, wherein
    the engine body includes a plurality of cylinders, and pistons which reciprocate within the respective cylinders,
    each of the first exhaust passage and the second exhaust passage includes a plurality of independent passages communicating with the plurality of the cylinders,
    the plurality of the independent passages of the first exhaust passage and the plurality of the independent passages of the second exhaust passage are respectively disposed in a row in a cylinder array direction, and the communication passage is formed in both ends of the partition wall positioned between the first exhaust passage and the second exhaust passage in the cylinder array direction.

13. The engine according to claim 8, wherein
the valve is a butterfly valve which rotates around an axis thereof extending in a direction orthogonal to a direction in which the first exhaust passage and the second exhaust passage are arranged, and
the butterfly valve is disposed in an inclined state in such a manner that an end of the butterfly valve on a side of the first exhaust passage is located on a downstream side in a flow direction of exhaust gas than an end of the butterfly valve on a side opposite to the first exhaust passage.

14. The engine according to claim 8, wherein, the communication passage extends along a line that extends from the first exhaust passage to the second exhaust passage, the communication passage having a maximum width in a direction transverse to the line, and the maximum width of the communication passage is less than a maximum width of the first exhaust passage in the direction transverse to the line and less than a maximum width of the second exhaust passage in the direction transverse to the line.

15. The exhaust device for an engine according to claim 14, wherein a length of the communication passage along the line extending from the first exhaust passage to the second exhaust passage is greater than the maximum width of the communication passage.

\* \* \* \* \*